July 28, 1942.    M. KLEIN ET AL    2,291,283
AUTOMATIC CONTROL SYSTEM
Filed Feb. 28, 1939
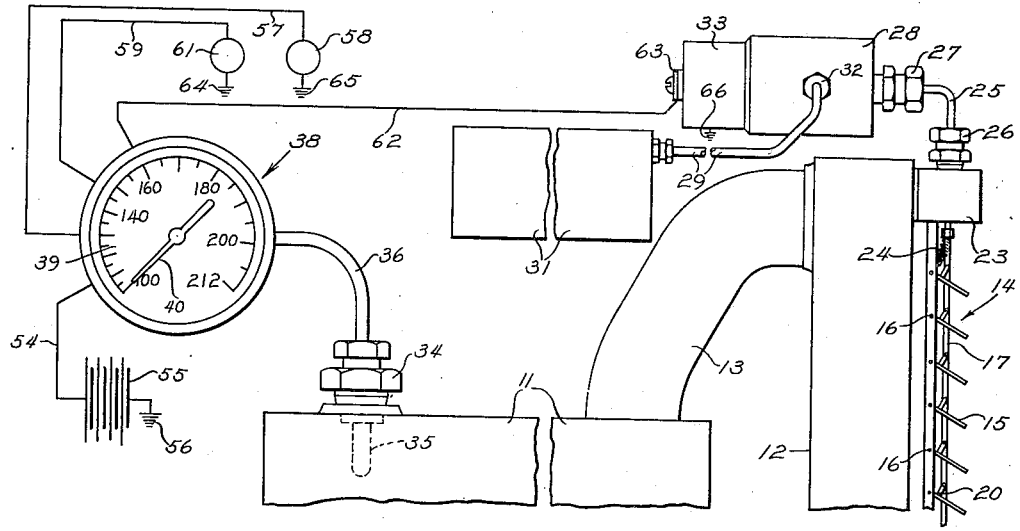
Fig. 1
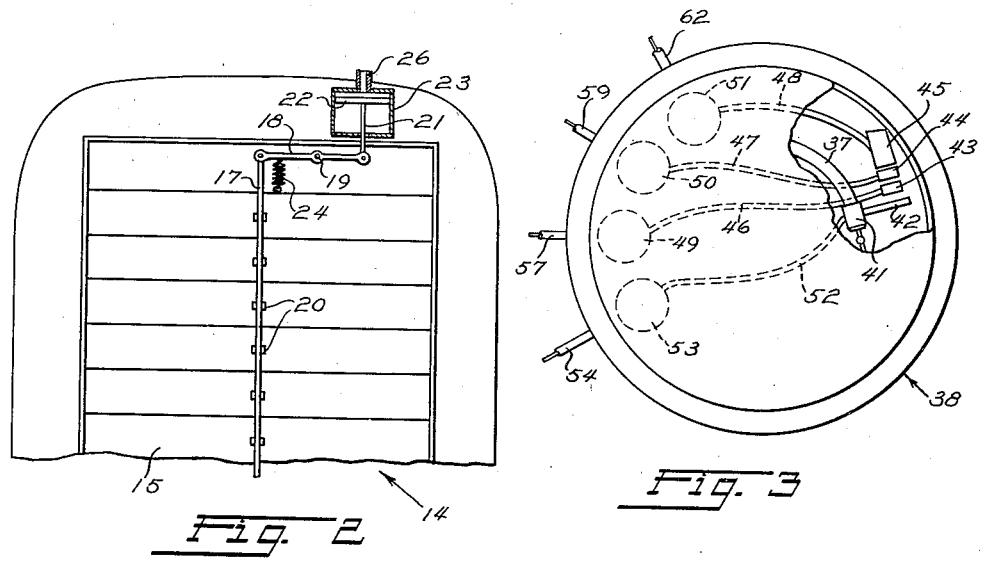
Fig. 2
Fig. 3
Inventor
Maximilian Klein
Bernhard Willach
By Strauch & Hoffman
Attorneys Patented July 28, 1942

2,291,283

UNITED STATES PATENT OFFICE 2,291,283

AUTOMATIC CONTROL SYSTEM

Maximilian Klein and Bernhard Willach, Sellersville, Pa., assignors to United States Gauge Company, Sellersville, Pa., a corporation of Pennsylvania Application February 28, 1939, Serial No. 259,040

4 Claims. (Cl. 236—35)

The present invention relates to control systems and is more particularly concerned with control systems which are automatically regulated or rendered operable by heat responsive means.

In its preferred embodiment the invention is especially designed for the control and regulation of the temperature of the cooling system of an internal combustion engine, but it will be understood that the principles involved are applicable to any cooling system control or any other apparatus wherein valves or similar control members are desired to be automatically operated under the action of heat responsive means.

Automotive vehicles in use in localities where the winter temperatures fall below freezing are often provided with automatic control mechanism for protecting the engine against such freezing temperatures especially while the engine is idle and during its initial warm-up periods.

Besides requiring protection during cold weather, many large vehicles such as heavy trucks and buses require accurate temperature control during all seasons of the year in order to keep the engine running as much as possible at the temperature at which it gives the most power and the highest fuel economy and the present invention is intended for use as an all season engine temperature regulator on such vehicles.

Most engine temperature regulating systems fall into one of two general classes. One type employs valves or by-passes for temporarily restricting the flow of cooling fluid in the cooling system until the engine has warmed up. The other type employs a shutter mechanism, one form of which, designed for cold weather use, is generally known as a "winterfront," which may be used to regulate the flow of air over the radiator and the engine. This type is applicable to both water-cooled and air-cooled engines, and in water-cooled engines it is generally secured across the front portion of the radiator outside the engine hood.

Shutter control mechanisms of the prior art have been mainly relatively complicated and expensive to install. They usually involve the provision of special thermostats which require much labor and consequent expense for adaptation to existing cooling systems. Many of these shutter control systems now in general use also employ power connections to the intake manifold of the engine with incident expenses in installation.

It is a major object of the present invention to provide a control system for automatically regulating the temperature of an internal combustion engine which is relatively inexpensive and which may be speedily installed upon existing engine equipment with a minimum of expense and labor. Specifically the control system of the invention is designed for bringing the temperature of the engine up to an efficient level speedily and maintaining it there as much as possible during operation. Although intended for use during all seasons, the system of the present invention may be easily removed during the hot weather seasons or for use in desert countries and no sealing plugs or similar devices are necessary to replace fittings removed with the system.

It is a further object of the present invention to provide a control system for automatically regulating the temperature of the cooling system of an internal combustion engine or the like in which an indicator mechanism responsive to the temperature of the cooling system is employed to actuate the system. Preferably, the indicator mechanism is also provided with visual indicator members.

A further object of the invention is to provide an automatic valve control wherein the valve mechanism is electrically actuated and the actuating circuit is controlled by an indicator mechanism. Specifically, a solenoid operated valve is employed with its actuating circuit controlled by a movable contact member in a thermostat control assembly.

A further object of the invention is to provide a control system for automatically regulating the temperature of the cooling system of an internal combustion engine in which the system is actuated by power derived from the engine and is operable by indicator mechanism responsive to the temperature of the cooling system. Preferably, the power derived from the engine is compressed air stored in a suitable storage tank which is provided with a suitable valve release connected to the indicator mechanism.

It is a further object of the invention to provide a power operated radiator shutter mechanism which is under the control of an indicator assembly responsive to the temperature of the cooling system in which the radiator is employed.

A further object of the invention is to provide a radiator shutter mechanism which is operated by fluid pressure and controlled by an indicator assembly responsive to the temperature of the cooling system in which the radiator is employed. Specifically, the fluid pressure connections are provided with a solenoid operated valve whose circuit includes a movable fluid pressure actuated contact element in the indicator assembly.

Further objects of the invention will presently appear as the description proceeds in connection with the appended claims and the annexed drawing in which:

Figure 1 is a diagrammatic view of the automatic control system of the present invention as applied to the radiator shutter mechanism of an internal combustion engine equipped with a special distant type thermometer;

Figure 2 is a diagrammatic front end view of the radiator shutter of Figure 1 illustrating the shutter actuating mechanism;

Figure 3 is an enlarged diagrammatic view illustrating the electrical circuit control mechanism of the temperature indicator.

Referring to Figure 1, an internal combustion engine 11 is connected to its cooling system radiator 12 by a suitable hose connection 13. Another hose connection (not shown) extends between the lower end of the radiator and the engine so that water or other cooling fluids, heated by operation of the engine, may be continually circulated by a suitable engine driven pump (not shown) through the water jacket of the engine and the radiator. In such arrangements air from in front of the radiator passes through the cooling passages of the radiator under the action of a conventional engine driven fan (not shown) and the motion of the vehicle.

A radiator shutter mechanism generally designated at 14 is arranged in front of radiator 12 to control and regulate the supply of air passed through the radiator and thereby regulate the temperature of the cooling system of the engine.

As illustrated in Figure 2, shutter 14 comprises a series of generally horizontal slats 15 provided at their inner ends with suitable pivot supports 16 upon the radiator support. A vertical operating arm 17, extending through suitable apertures in slats 15, is pivotally connected to each slat by a suitable lost motion connection 20.

The upper end of arm 17 is pivotally connected to one end of a lever 18 which rotates about a fixed pivot 19 on the radiator support. The free end of lever 18 is pivotally attached to the lower end of a piston rod 21 rigid with a piston 22 operating in a cylinder 23. Suitable lost motion connections are provided at the opposite end pivots of lever 18 and a suitable spring assembly 24 urges lever 18 to rotate in a counterclockwise direction in Figure 2 and take up any slack in the linkage between piston rod 21 and slats 15. Spring 24, therefore, normally urges slats 15 to rotate in a counterclockwise direction toward closed shutter position at the front of the radiator. Any other suitable linkage may be used between piston rod 21 and slats 15 for the same purpose as desired.

A conduit 25 is provided with suitable end connections 26 and 27 opening into cylinder 23 and a valve assembly designated at 28, respectively. An inlet conduit 29 extends between a suitable air pressure storage tank 31 and a suitable end connection 32 opening into valve 28. Tank 31 is preferably kept charged by a suitable compressor mechanism driven by the engine and may comprise the usual air storage tank now in general use upon trucks, buses and other vehicles which use air brakes, compressed air operated hoists and the like. The valve mechanism inside valve 28 is operated by a suitable solenoid 33 which normally holds the valve mechanism closed. Since the present invention is not concerned with the structure of solenoid operated valve 28 and since any suitably operated valve may be used at 28, this feature need not be further described. The purpose of valve 28 will be later described.

The engine block is provided with a threaded opening adjacent its rear end which opens into the water jacket and is provided with suitable adapter connections 34 for mounting a thermometer bulb 35. A suitable capillary tube 36 extends from bulb 35 to the movable Bourdon tube element 37 of a temperature indicator assembly 38 which is preferably mounted upon an instrument board so that its dial and pointer 40 are in full view of the operator of the vehicle.

In addition to operating pointer 40, element 37 is provided at its free end with a supporting clamp 41 from which extends a contact member 42 of some electrically conductive material. Three spaced electrically conductive plates 43, 44 and 45 are secured to the casing of indicator 38 and are arranged to be traversed in sequence by contact 42 during the normal movement of element 37.

Plates 43, 44 and 45 are connected by wires 46, 47 and 48 to suitable binding posts 49, 50 and 51, respectively. Contact 42 and clamp 41 are connected by a wire 52 to a binding post 53. A lead 54 connects post 53 to one terminal of a battery 55 whose other terminal is grounded to the vehicle frame at 56. Battery 55 may be the usual storage battery of the conventional automobile. If desired, lead 54 may pass through the usual ignition switch of the engine so that the subsequently described circuits controlled by the indicator 38 are not operable except when the ignition switch is closed.

A lead 57 connects post 49 to a suitable signal 58 which emits red light when energized. A lead 59 connects post 50 to a suitable signal 61 which emits green light when energized. Another lead 62 connects post 51 to a suitable binding post 63 at solenoid 33. Signals 58 and 61 and solenoid 33 are suitably grounded to the frame at 64, 65 and 66, respectively. Signals 58 and 61 are preferably both located on the instrument board near dial 39.

The above described temperature indicator and switch assembly is an embodiment of the combined indicator and electrical circuit controller described and claimed in the copending application of myself and Bernhard Willach, Serial No. 43,432, filed October 3, 1935 which issued as Patent No. 2,159,702 on May 23, 1939. Since the indicator assembly of the present invention is constructed similarly to that disclosed in the above mentioned application with the addition of further shutter control circuit to the indicator assembly described therein and since the present invention is not concerned with the specific construction of this indicator assembly per se, there is no need for further description of the same.

The present invention is, however, concerned with the use of such a combined temperature indicator and electrical circuit controller associated with an internal combustion engine assembly in such a manner as to regulate the temperature of the cooling system of the engine as will be described below.

*Operation*

With the engine cold and idle, radiator slats 15 are urged into and held in shutter closed position by the action of spring 24 and thus prevent air from being passed through the radiator cooling passages as it normally would if the shutter were not present. When the engine is started, the shutter remains closed and the circulating cooling fluid in the cooling system is heated rapidly by the operation of the engine because it is not appreciably cooled as it passes through the radiator.

As the cooling fluid rises in temperature, the expansible fluid in bulb 35 and tube 36 is heated and expanded, thus causing expansion of element 37 and consequent movement of its free end which contains contact 42.

When the temperature of the cooling fluid, as indicated in the present embodiment on dial 39, rises to a predetermined degree, contact 42 engages plate 43 to complete the circuit of red signal 58 which indicates to the operator that the temperature of the cooling fluid is still too low to open the shutters which remain closed. When the temperature of the cooling fluid rises a predetermined step higher contact 42 has moved into engagement with plate 44 to complete the circuit of green signal 61. Red signal 58 is, of course, now deenergized. The green signal indicates that another stage in the operating temperature of the cooling fluid has been reached and that the cooling fluid is approaching normal running temperature.

When the temperature of the cooling fluid reaches a third point, preferably just a few degrees below normal running temperature, the green signal is no longer energized and the contact 42 is engaged with plate 45 to complete the circuit of solenoid 33. When energized in this matter, solenoid 33 actuates the valve mechanism of valve 28 to permit air pressure to be transmitted to cylinder 23 from tank 31. The temperatures at which plates 43, 44 and 45 are engaged by contact 42 may be selected at will according to the operating characteristics of the engine to be controlled.

When pressure is admitted to cylinder 23, piston 22 is forced downwardly and acts through lever 18 and arm 17 to pull slats 15 into the shutter open position of Figure 1 where they will remain while the engine is in operation and while the temperature of the cooling fluid is above a predetermined minimum.

Obviously, the location and size of plate 45 is so correlated to the amplitude and path of movement of contact 42 that the shutter will be opened at a predetermined minimum temperature and will remain open for all temperatures above that minimum which is preferably slightly less than the normal temperature of the engine cooling fluid during normal operation of the engine. For all cooling fluid temperatures below that predetermined minimum, the shutter will remain closed to cut off the air supply from the radiator and thus hasten heating of the cooling fluid.

Whenever, during operation of the engine with the shutter open, the air temperatures become low enough to lower the temperature of the cooling fluid below the predetermined minimum, the shutter is automatically closed by the switch mechanism of the invention which de-energizes the circuit of solenoid 33 and permits spring 24 to pull slats 15 into shutter closed position. A suitable vent mechanism is provided at valve 28 for permitting escape of air from the radiator shutter side of the valve when the valve is closed and spring 24 is returning the slats to closed position.

When operation of the motor is stopped, with the shutter open, the slats 15 remain in the open position shown in Figure 1 until the temperature of the cooling fluid has dropped below the predetermined minimum. Then solenoid 33 will be de-energized and spring 24 will urge slats 15 into shutter closed position. If lead 54 passes through the ignition key, de-energization of solenoid 33 and consequent closure of the shutter independent of the temperature of the cooling fluid will take place immediately upon ceasing operation of the engine.

As explained above the invention has been described in its preferred embodiment and is applicable to the operation of any valve mechanism by a heat responsive indicator assembly. Furthermore, as applied to the regulation of the temperature of the cooling systems of internal combustion engines, the invention is not limited to the operation of fluid pressure operated radiator shutters, but is applicable to control any electrical or power operated shutter mechanism.

Finally, the invention is not limited to the control of shutter mechanisms when applied to internal combustion engines but is of such scope as to include operation of flow restricting valves and by-passes and any other temperature regulating means for the cooling systems of internal combustion engines.

The chief advantages of the present invention are its relatively low cost and the ease and economy with which it can be mounted upon existing internal combustion engine installations, especially those already equipped with the combined temperature indicator and electrical circuit controller above described. Moreover, this controller can easily be substituted for conventional heat indicators already in use upon existing engine installations.

No additional expensive thermostats are needed and there is no need to attach special equipment to the engine or drill new holes in the water jacket. The usual thermostat already in use on the engine for the engine cooling fluid temperature indicator is used, or can easily be replaced by the indicator assembly of the invention.

The solenoid valve and the shutter mechanism are quickly installed and just as easily removed without interfering with the normal cooling system of the engine, thus effecting a saving in labor and time. Furthermore, the control system of the invention is relatively simple and is made up of standard mechanism units which can be purchased separately in case of failure of any part and inserted in the system of the invention without much labor or trouble. The various elements of the system, such as the control valve 28 and the pneumatic assembly at 23, are rigidly secured upon the vehicle by suitable brackets as desired.

The term "power operated" in the present disclosure refers to any type of power, electrical, air pressure, vacuum or the like which is used to operate the system of the invention. The electrical power may come from the storage battery which derives its power from the engine.

The term "fluid pressure" is applied to positive pressures due to fluids such as air as well as to negative pressures or various degrees of vacuum. Negative pressures may be obtained from a suitable connection to the intake manifold and in such a case the apparatus of Figure 2 could be operated satisfactorily by eliminating lever 18 and attaching piston rod 21 directly to arm 17.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims as therefore intended to be embraced therein.

What is claimed and desired to be secured by United States Letters Patent is:

1. For use on a vehicle provided with an instrument board and an internal combustion engine assembly having shutter mechanism shiftable between open and closed position for regulating the flow of cooling air thereto, means for normally urging said shutters to closed position, pneumatic motor means operable to open said shutter mechanism; a valve shiftable between open and closed position, operable to connect said motor to a pressure source when open; solenoid means operable to move said valve to open position; and engine connected thermometer means on said instrument board comprising a movable visual gauge member for indicating the temperature of said engine, electric switch means in the circuit of said solenoid and a pressure responsive element movable in response to changes in temperature of the engine for operating both said visual gauge member and said switch means.

2. In combination with an internal combustion engine having a liquid cooling system including a radiator and a shutter mechanism shiftable between open and closed positions for controlling the air flow through said radiator; means normally operable to retain said shutter mechanism in closed position; a fluid motor operable to shift said shutter mechanism to open position, means for supplying fluid to said motor; electrically operated valve means connecting said supply and motor means; a distant means operably responsive to the temperature of said system; a temperature indicator responsive to said distant means; and an electric circuit controlled by said distant means and adapted to operate said valve means in response to the attainment of a predetermined temperature by said cooling system.

3. In combination with an internal combustion engine having a cooling system, a shutter mechanism operable to cut off or permit the passage of air through said system, and an engine temperature indicator; means normally operable to retain said shutter mechanism in one extreme position; a fluid motor operable to shift said shutter mechanism from said one extreme position to another extreme position when actuated; means for supplying fluid to said motor; valve means operable to render said supply means fully effective or ineffective; means for operating said indicator; and an electric circuit controlled by said last-named means and adapted to operate said valve means in response to the attainment of a predetermined temperature by said cooling system.

4. For use in combination with an internal combustion engine having a cooling system operable to be controlled by the passage of air therethrough, and having a cooling system temperature indicator; shutter means shiftable between open and closed positions to permit or stop the passage of air through the system; pneumatic motor means operable to shift said shutters to one position, and means operable to return said shutters to the other of said positions when said pneumatic motor is ineffective; a valve shiftable to render said motor means fully effective or ineffective; solenoid means operable to shift said valve; and an electrical circuit for energizing said solenoid, including a switch operable to be controlled by said engine temperature indicator upon the attainment of a predetermined temperature of the cooling system, whereby said shutter means are shifted to full opposite position.

MAXIMILIAN KLEIN.
BERNHARD WILLACH.